(12) United States Patent
Rousu

(10) Patent No.: US 7,194,284 B2
(45) Date of Patent: *Mar. 20, 2007

(54) METHOD AND APPARATUS FOR ACCOMMODATING TWO MOBILE STATION ANTENNAS THAT OPERATE IN THE SAME FREQUENCY BAND

(75) Inventor: Seppo Rousu, Oulu (FI)

(73) Assignee: Nokia Corporation, Espoo (FI)

( * ) Notice: Subject to any disclaimer, the term of this patent is extended or adjusted under 35 U.S.C. 154(b) by 383 days.

This patent is subject to a terminal disclaimer.

(21) Appl. No.: 10/023,561

(22) Filed: Dec. 18, 2001

(65) Prior Publication Data

US 2003/0114188 A1    Jun. 19, 2003

(51) Int. Cl.
*H04M 1/00* (2006.01)

(52) U.S. Cl. .................... 455/553.1; 455/90; 455/78; 455/552.1; 455/83

(58) Field of Classification Search ............... 434/702, 434/725, 850, 729, 700, 575, 552.1, 83; 455/553, 455/90, 78, 575, 552.1, 83, 500, 101, 422.1, 455/522.1, 121; 343/702, 725, 850; 375/148
See application file for complete search history.

(56) References Cited

U.S. PATENT DOCUMENTS

| | | | | |
|---|---|---|---|---|
| 5,691,730 | A * | 11/1997 | Egashira et al. ............ 343/702 |
| 5,926,503 | A * | 7/1999 | Kelton et al. ............... 375/148 |
| 6,072,993 | A * | 6/2000 | Trikha et al. ................. 455/78 |
| 6,101,374 | A * | 8/2000 | Kono ...................... 455/115.1 |
| 6,175,334 | B1 * | 1/2001 | Vannatta et al. ........... 343/702 |
| 6,496,150 | B1 * | 12/2002 | Li et al. ..................... 343/702 |
| 6,600,931 | B2 * | 7/2003 | Sutton et al. ............ 455/552.1 |
| 6,633,748 | B1 * | 10/2003 | Watanabe et al. ............. 455/78 |
| 6,657,595 | B1 * | 12/2003 | Phillips et al. .............. 343/702 |
| 6,920,315 | B1 * | 7/2005 | Wilcox et al. .............. 455/121 |
| 2002/0095271 | A1 * | 7/2002 | Brinsfield ................... 702/189 |
| 2002/0183013 | A1 * | 12/2002 | Auckland et al. ............. 455/73 |
| 2003/0001784 | A1 * | 1/2003 | Li et al. ..................... 343/702 |
| 2003/0008693 | A1 * | 1/2003 | Tanaka et al. .............. 455/575 |
| 2003/0052824 | A1 * | 3/2003 | Ollikainen et al. .. 343/700 MS |

* cited by examiner

*Primary Examiner*—Joseph Feild
*Assistant Examiner*—David Q. Nguyen
(74) *Attorney, Agent, or Firm*—Harrington & Smith, PC

(57) ABSTRACT

A method is disclosed for operating a multi-mode mobile station, wherein each mode shares at least one common band of frequencies. The method includes transmitting a signal from a first antenna circuit of the mobile station in the common band of frequencies and, while transmitting, electronically detuning a second antenna circuit of the mobile station such that the second antenna circuit is not resonant in the common band of frequencies. As an example, the common band of frequencies includes 1900 MHz. The step of detuning includes varying an impedance of at least one component that forms a part of the second antenna circuit, where the at least one component can be a stripline or a PIN diode of a FET diode uses as switch for making an impedance change. The at least one component can also be a normally active component that is put into a passive state. A multi-mode mobile station in accordance with these teachings has, for each mode, a transmitter chain that includes an antenna circuit that operates in the common band of frequencies and a controller, that is responsive to a first one of the transmitter circuits transmitting, for electronically detuning a second antenna circuit of the mobile station such that said second antenna circuit is resonant at a frequency that lies outside of, or that is shifted away from, the common band of frequencies.

21 Claims, 3 Drawing Sheets

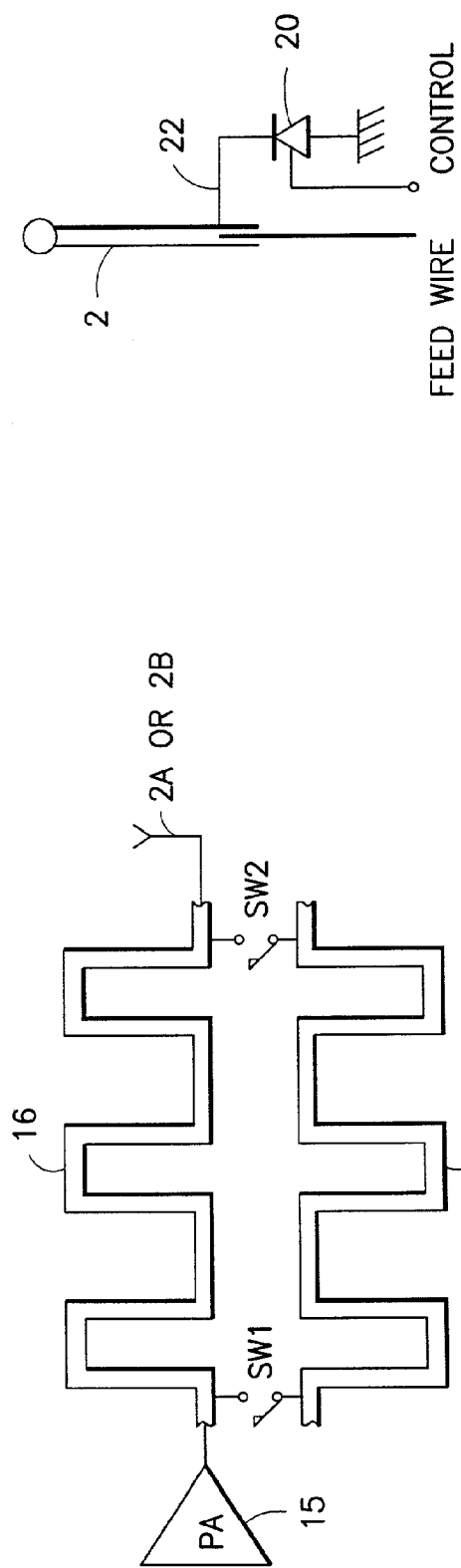
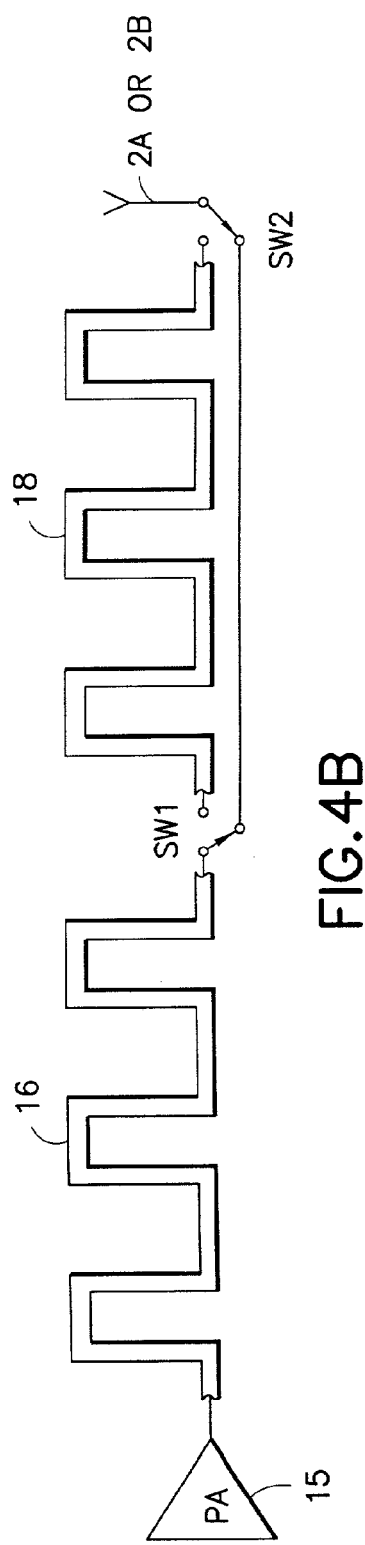
FIG.4A
FIG.4B
FIG.5

METHOD AND APPARATUS FOR ACCOMMODATING TWO MOBILE STATION ANTENNAS THAT OPERATE IN THE SAME FREQUENCY BAND

TECHNICAL FIELD

These teachings relate generally to wireless communication devices, also referred to as mobile stations, such as cellular telephones and personal communicators and, more particularly, relate to dual mode and higher mobile stations that operate in two or more overlapping frequency bands.

BACKGROUND

Multi-mode mobile stations are commonly available. During the use of a multi-mode mobile station it may be the case that the two supported cellular systems operate in the same center frequency band (for example, Wideband CDMA (WCDMA) 1900 MHz and the Global System for Mobile Communications (GSM)1900 MHz.) Also, the IS-95 and TDMA systems may all operate in the same frequency band. Furthermore, in the 850 MHz band there are the AMPS, 850 TDMA, 850 GSM and CDMA systems In a typical case one antenna is used for transmitting and receiving in both of the cellular systems. As an example, and referring to the dual mode system 1 shown in FIG. 1, the WCDMA 1900 MHz and the GSM 1900 MHz RF (Radio Frequency) subsystems, which may be embodied in the same ASIC or in separate ASICs 4 and 5, can each have their own transmit (TX) chain and associated power amplifier (PA). The working assumption has been that only one antenna 2 is used that has a single feed point (FP). For this to be true the GSM and WCDMA branches are coupled to the antenna 2 by an antenna switch (SW) 3.

The use of one antenna has been preferred due to the fact that the radiation pattern has been found to be impaired when there is another antenna nearby that operates on the same frequency. This case is shown in FIG. 2, where it is assumed that the WCDMA 1900 antenna 2A is transmitting, and that the GSM 850/1900 antenna 2B on the same mobile station is coupling in undesired energy from the WCDMA 1900 antenna transmission. The result is that the electromagnetic energy propagation pattern of the WCDMA 1900 antenna 2A is interfered with. The same situation can exist when the antenna 2B is transmitting, and undesired energy is coupled into the antenna 2A.

Referring again to FIG. 1, since the antenna switch 3 can be damaged by high voltage spikes, an electrostatic discharge (ESD) protection device 6 is typically installed between the switch 3 and the antenna 2. However, the use of the switch 3 and the ESD device 6 results in a loss of about 1 dB (0.5 dB loss in each of the switch 3 and the ESD device 6) in all modes of operation.

To reiterate, the use of two same frequency-tuned antennas in the prior art has proved to be difficult because of the coupling phenomenon between two same-resonance frequency antenna circuits. The coupling phenomenon has been known to reduce the antenna radiation gain. As a result, it is also known to use a single antenna 2 that is selectively coupled to either the first mode circuitry or the second mode circuitry through the switch 3. However, the use of the switch 3 also requires the presence of the ESD device 6 to prevent the switch from being damaged by static electric discharges coupled in through the antenna 2. Unfortunately, the use of the switch 3 and the ESD device 6 inserts a loss about 1 dB in all modes of operation, including the receive mode of operation. For example, the increased losses can result in a reduction in receiver sensitivity (by about 1 dB), as the switch 3 and ESD device 6 function to attenuate the already low level received signal.

It has further been found that by incurring additional losses after the power amplifier, such as by providing the switch 3 and ESD device 6, the efficiency of the power amplifier is reduced. This reduction in efficiency results in an increase in current consumption and a consequent reduction in battery life, user talk-time and mobile station standby time. Also, the additional losses result in the generation of a higher operating temperature. The higher operating temperatures can be manifested by a noticeable heating of the case of the mobile station, by power amplifier reliability problems related to increased junction temperatures, and also by a drift in the frequency responses of the RF components.

SUMMARY OF THE PREFERRED EMBODIMENTS

The foregoing and other problems are overcome, and other advantages are realized, in accordance with the presently preferred embodiments of these teachings.

In accordance with the teachings of this invention the mobile station is provided with two antennas, thereby eliminating the need for the antenna mode selection switch and the ESD protection component and the resulting losses and related thermal and other problems. The undesirable coupling of transmitted energy from one antenna circuit into the other is minimized or reduced by detuning or retuning the non-transmitting antenna circuit such that it no longer has a resonant frequency in the frequency band being transmitted. The detuning or retuning is performed automatically and electronically by any number of techniques, such as by changing the length of a strip line RF element, or by de-activating an active RF component, or by mechanically retuning an external antenna by changing the antenna length. In addition, an internal antenna can be constructed so as to be disconnected when an external antenna is used.

A method is disclosed for operating a multi-mode mobile station, wherein each mode shares at least one common band of frequencies. The method includes transmitting a signal from a first antenna circuit of the mobile station in the common band of frequencies and, while transmitting, electronically detuning a second antenna circuit of the mobile station such that the second antenna circuit is not resonant in the common band of frequencies. As an example, the common band of frequencies includes 1900 MHz. The step of detuning includes varying an impedance of at least one component that forms a part of the second antenna circuit, where the at least one component can be a stripline, or a PIN diode, or a FET diode. The at least one component can also be a normally active component that is put into a passive state.

A multi-mode mobile station in accordance with these teachings has, for each mode operating within at least one common range of frequencies, a transmitter circuit chain that includes an antenna circuit that operates in the common range of frequencies and a controller. The controller is responsive to a first one of said transmitter circuits transmitting, for electronically detuning a second antenna circuit of the mobile station such that the second antenna circuit is mis-matched to the first antenna circuit so as to minimize coupling of the transmitted signal from the first antenna circuit into the second antenna circuit. For example, the common range of frequencies may include 1900 MHz or 850 MHz.

The controller, when detuning the second antenna circuit, may vary an impedance of at least one component that forms a part of the second antenna circuit. The at least one component could include a stripline, a PIN diode, a variable capacitance, a FET diode, or an active component that is put into a passive state (or vice versa).

The controller, when detuning the second antenna circuit, may also operate at least one switch for adding a length of strip line to, or for subtracting a length of strip line from, the second antenna circuit. The controller may also operate at least one switch for connecting a length of strip line to ground, or for disconnecting a length of strip line from ground.

The end result is that the second antenna circuit becomes resonant at a frequency that lies outside of, or that is shifted away from, the common range of frequencies. Alternatively, the second antenna circuit may become disabled to the point that it is not resonant at any frequency. Note that the common range of frequencies may extend over the entire operational frequency range or band of both antenna circuits, or it may extend over but a portion of the operational frequency range of the first antenna circuit and the second antenna circuit (i.e., the operational frequency ranges are overlapped, but not equal and coincident).

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 4A and 4B illustrate two exemplary techniques using striplines for detuning the inactive antenna system of FIG. 3;

FIG. 5 shows the use of a PIN diode in a ground wire of the antenna for detuning the antenna.

DETAILED DESCRIPTION OF THE PREFERRED EMBODIMENTS

Figure 3:
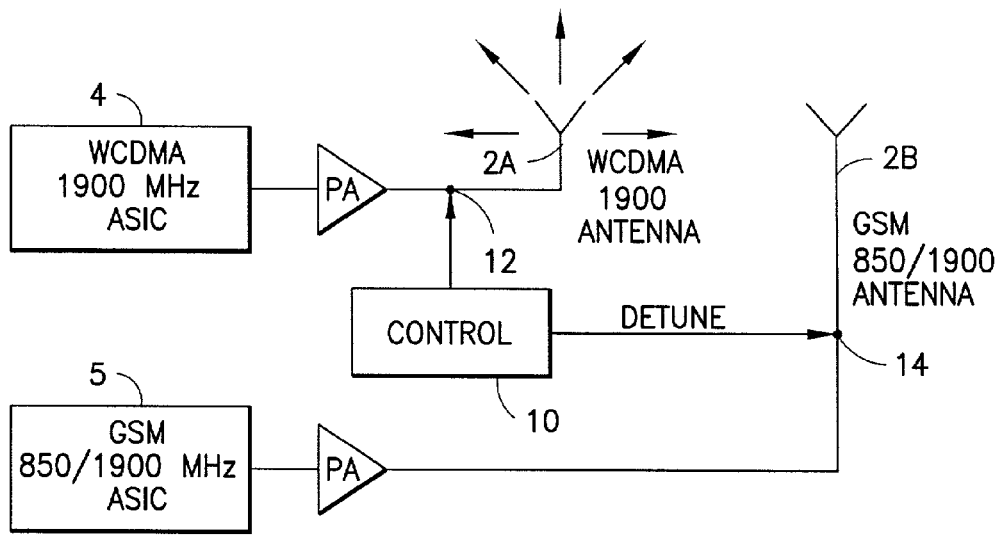
FIG. 3 illustrates the use of two antennas in accordance with this invention, wherein a currently unused antenna is detuned or retuned so as not to be resonant in the band of frequencies being utilized by the other antenna.

Referring to FIG. 3, the antenna system 2 can include one, two or more antennas, and one antenna can contain one or several resonant frequencies. The embodiment of FIG. 3 is simplified, as a duplexer may be present between the output of the power amplifier (PA) and the antenna feedpoint. Generally, the resonance band of an antenna 2 covers both the receiver and transmitter frequencies. The antenna system can also use separate receive and transmit antennas, where the receive antenna covers the receiver band of both cellular systems and the transmit antenna covers the transmit band of both cellular systems. The teachings of this invention can be used as well in the case of separate receive and transmit antennas, where the antennas do not operate at exactly at same frequency. In general, isolation between transmitter and receiver antenna is specified by duplex separation. If the unused antenna (receive or transmit) is shifted to another frequency then additional isolation is achieved between the receiver and transmitter antennas. This technique aids as well in the specification of RF components, as less expensive components may be used since the nonactive RF antenna circuitry is simply detuned and prevented from interfering with the active RF antenna circuitry.

It is pointed out that while FIG. 3 shows the use of the two ASICs 4 and 5, that a single ASIC could be employed that contains the circuitry for both the WCDMA 1900 MHz and the GSM 850/1900 MHz systems.

Exactly how the antenna is tuned out of its resonance band depends on several factors, including ease of use, complexity and cost. It is assumed that some control device 10 is available to supply a detune signal to a node 12 in the antenna circuitry 2A or to a node 14 in the antenna circuitry 2B. The control circuit may be a CPU or a DSP device of the mobile station. The nodes 12 and 14 are assumed to contain some means for detuning the antenna circuitry away from the normal resonant frequency of the antenna circuitry. This is accomplished when the other antenna circuitry is transmitting in a frequency band that overlaps the operational frequency band of the antenna circuitry. As an example, and assuming that the WCDMA antenna circuitry 2A is transmitting, then the GSM 850/1900 antenna circuitry 2B is detuned to, for example, 1500 MHz. The end result is that the GSM 850/1900 antenna circuitry 2B appears as a high impedance to the WCDMA 1900 MHz transmission, and has a minimal impact on the RF propagation of the WCDMA 1900 MHz transmission.

One technique for changing the antenna resonant frequency is through the use of a stripline 16, as shown in FIGS. 4A and 4B. In this case the antenna's resonant frequency is established at least in part by the use of the stripline 16 (shown by way of example and not by way of limitation as a serpentine-type of stripline). The resonant frequency of the antenna 2 is shifted by shortening the stripline or by lengthening the stripline, as in FIG. 4B. When detuning the antenna 2, two switches may be used to short around a length of strip line 18, thereby effectively shortening the stripline, or to add in the length of stripline 18, thereby effectively lengthening the stripline. In either case the effective resonant frequency of the antenna circuit 2 is changed, which is the desired result. Referring to FIG. 4A, the two switches may also be used to change the resonant frequency by connecting the additional length of stripline 18 in parallel with the original stripline 16, thereby again changing the resonant frequency. It is also within the scope of these teachings to shift the antenna resonant frequency by connecting to or disconnecting from ground the antenna stripline through a switch, or to connect to or disconnect from the antenna circuit 2 an additional strip line.

Another technique for detuning the antenna circuitry is through the use of a PIN diode. The placement of the PIN diode is chosen so that the desired frequency shift is achieved. Referring to FIG. 5, in practice the placement of the PIN diode 20 in the grounding wire 22 of the antenna is more convenient than placement in the RF feeding wire, as there is less of an impact on the RF performance of the antenna. The PIN diode 20 in this case acts as a switch that disconnects and connects the antenna grounding wire, thereby shifting the resonant frequency of the antenna 2. Alternatively, one may employ a FET device as a diode in place of the PIN diode 20.

Another technique for changing the resonant frequency of the antenna 2 controlling the on/off impedance of an active element that forms a part of the antenna circuitry 2, where the antenna and the active element together form a resonance circuit for the desired frequency band. In this case the antenna 2 is in tuned to the correct resonant frequency when the active element is activated, and becomes mismatched to the correct resonant frequency when the active element becomes passive by being turned off. A varactor is one type of electrically controlled active element. In general, one may vary the capacitance, or the inductance, or the resistance (or a combination of these) of at least one active element in order to mismatch the non-active antenna circuit to the transmitting antenna circuit.

The antenna can also be tuned by an RF switch to be matched to a correct frequency band, and if the RF switch is passive the antenna becomes mismatched to the frequency band.

Figure 6A:
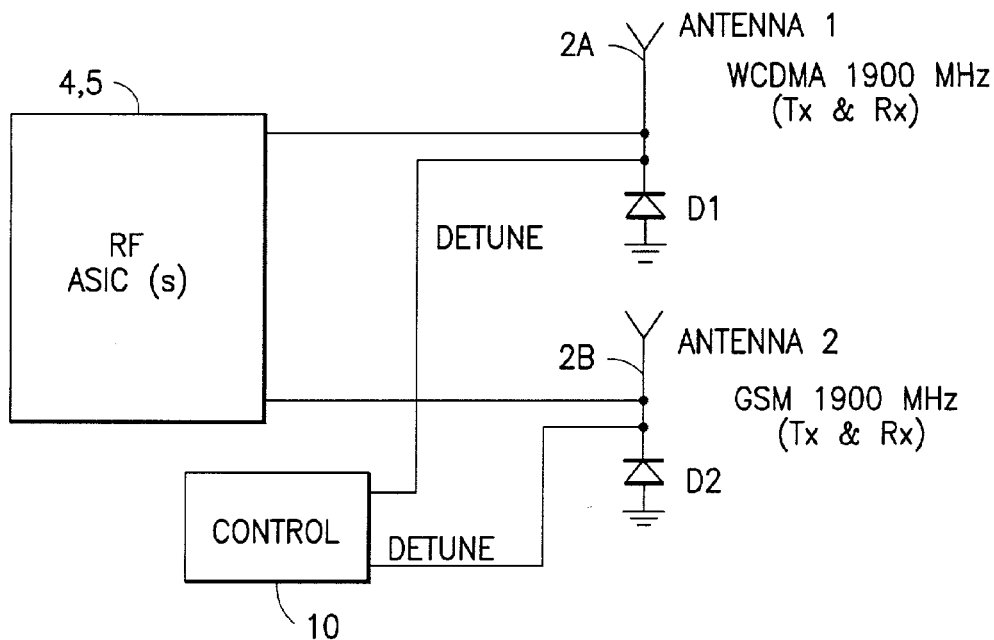
FIGS. 6A and 6B illustrate two different embodiments of transmit and receive antennas for multi-protocol use, such as GSM 1900 MHz and WCDMA 1900 MHz, or TDMA 850 MHz and GSM 850 MHz.
Figure 6B:
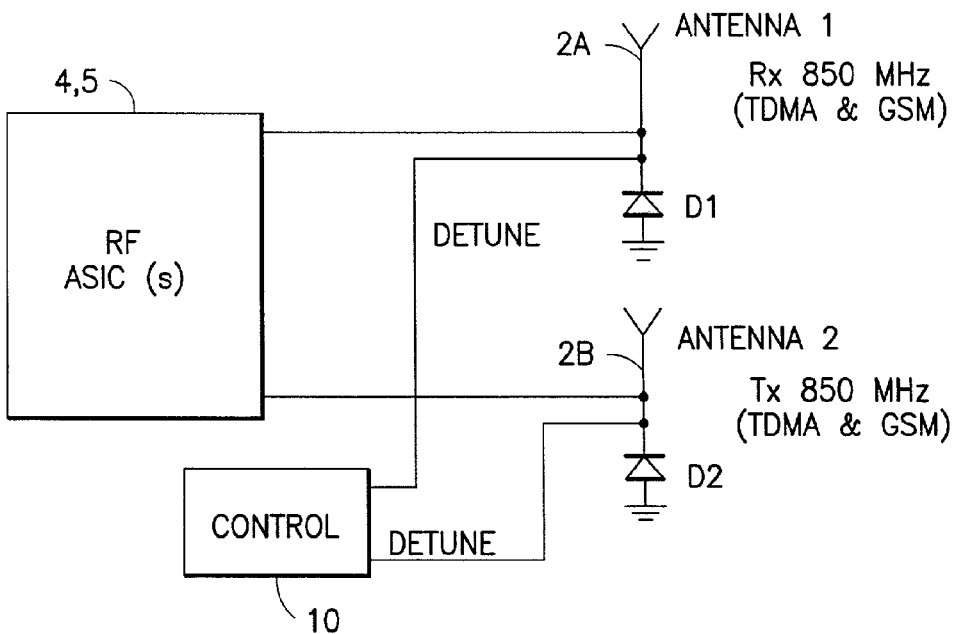

In a dual antenna system it is possible to locate the transmission (TX) band and the reception (RX) band by several different techniques. Reference in this regard is made to FIGS. 6A and 6B.

FIG. 6A shows the case where the TX and RX bands of the same protocol are located on the same antenna (2A or 2B). In this case, and by example, WCDMA 1900 MHz RX and TX are on antenna 1, and the GSM 1900 MHz RX and TX are on antenna 2.

When the diode 1 is off and the diode 2 is on the antenna of system 1 is at the TX frequency band (WCDMA 1900 MHz) and the antenna of system 1 is at the RX frequency band (WCDMA 1900 MHz). When the diode 1 is on and the diode 2 is off the antenna of system 2 is at the RX frequency band (GSM 1900 MHz) and the antenna of system 2 is at the TX frequency band (GSM 1900 MHz).

FIG. 6B shows the case where the TX and RX bands of the same protocol are located on different antennas (2A and 2B). In this case, and by example, the two protocols are TDMA 850 MHz and GSM 850 MHz. When diode 1 is off and diode 2 is on, the antenna of system 1 is at the RX frequency band (TDMA RX 850 MHz) and the antenna of system 1 is at the RX frequency band (GSM TX 850 MHz). When diode 1 is on and diode 2 is off, the antenna of system 2 is at the TX frequency band (TDMA TX 850 MHz) and the antenna of system 2 is at TX frequency band (GSM TX 859 MHz).

As an example, assume that the antenna system 2A of FIG. 3 is radiating energy that spreads into three dimensional space. The antenna system 2B is tuned to about same frequency range and absorbs part of this energy. The result in that the gain of the antenna system 2A is reduced, and the performance of the antenna system 2A is reduced. According to this invention the resonant frequency of the currently unused antenna system (2B in this example) is tuned to a frequency other than the frequency of the radiating antenna, and the performance of the active antenna system is maintained at an acceptable level.

It should be realized that the current required to operate the switches shown in FIGS. 4A, 4B and 5 can be routed through another component that is required to be operated at the same time, thereby conserving battery current.

A number of advantages can be realized through the use of these teachings in accordance with the invention. These include the introduction of less loss after the power amplifier, resulting in less current consumption (increased talk and standby times) and reduced heating (increased user comfort and reliability). A further advantage is an improvement in antenna radiation gain, as compared to the use of two feedpoints at same frequency with no tuning.

Figure 1:
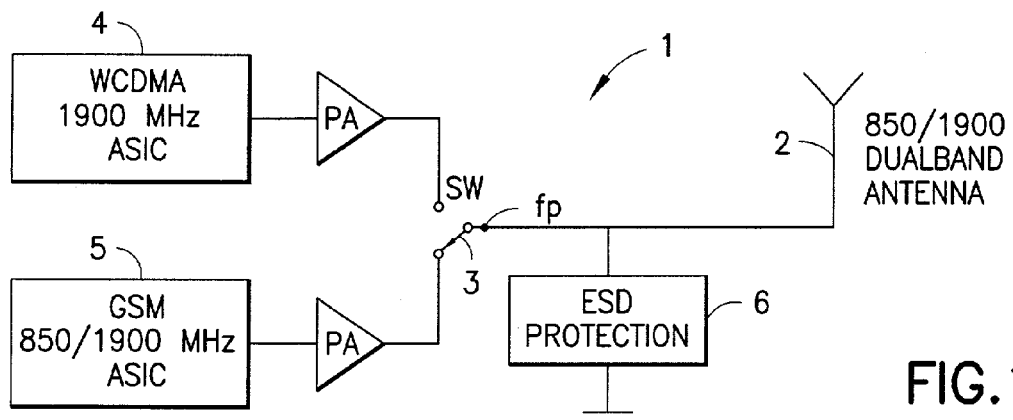
FIG. 1 illustrates a prior art technique for coupling two cellular system ASICs to a common antenna.
Figure 2:
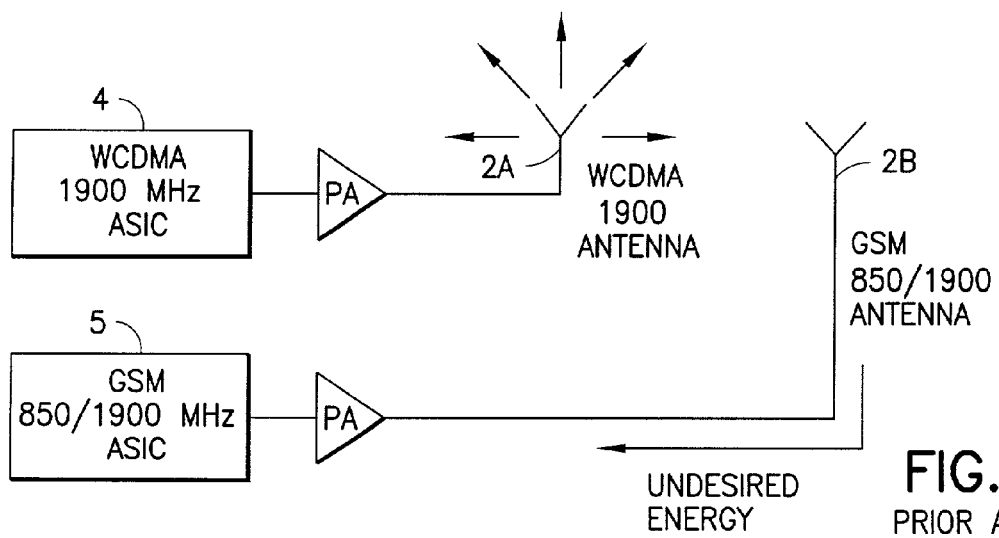
FIG. 2 illustrates the problem that is created when two antennas are used, one for each of the two cellular system ASICs, when the cellular systems operate in the same frequency band.

Other advantages include, but are not limited to, the ability to provide a lower power level that is requested by the base station, the RF strip lines can be made shorter, improved receiver sensitivies as compared to the conventional RF antenna switch-ESD configuration shown in FIG. 1 and the simplification of the circuitry means that the circuit board layout design is facilitated.

It is noted that for antenna tuning purposes the linearity requirements for the various switches (e.g., SW1 and SW 2 shown in FIGS. 4A, 4B) need not be as stringent as for the antenna switch (SW) shown in FIG. 1. This is true because the switches SW1, SW2 can be FET-based diode switches that operate with, for example, 50 uA of current, as opposed to the use of a PIN diode switch that operates with milliamps of current.

The teachings of this invention can be applied to different antenna combinations, such as a Planar Inverted F-Antenna (PIFA) and helical types of antennas. The antennas may be internal or external to the mobile station. The antennas 2A and 2B for each of the operational modes may be physically separated, or they may be contained within a common enclosure. The antennas could share a common frame.

It is further noted that the two frequency ranges or bands may be identical and coincident with one another such that they totally overlap one another, or they may only partially overlap one another. In this latter case the antenna resonant frequency detuning of the unused antenna circuit may only be done when operation of the other antenna will result in a transmission within the overlapped portion corresponding to a common range of frequencies within the two frequency bands.

These teachings are not limited to only two frequency bands and two antennas, but may be employed as well with tri-mode and higher mobile stations wherein it may be desirable to detune or desensitize more than one antenna circuit when transmitting on another antenna circuit.

Thus, while described in the context of presently preferred embodiments, it should be appreciated that these teachings may be implemented in various ways, and that the teachings of this invention are not intended to be limited in scope to only the presently preferred embodiments that were described above.

What is claimed is:

1. A method for operating a multi-mode mobile station comprising at least first and second antennas, each of the first and second antennas having resonance frequencies, wherein at least two modes of the multi-mode mobile station operate within at least one common range of frequencies, the method comprising:
   transmitting a signal from the first antenna of the mobile station in the common range of frequencies; and
   changing the resonance frequency of the second antenna of the mobile station so as to reduce coupling of the transmitted signal from the first antenna into the second antenna, wherein the step of changing comprises varying an impedance of at least one component that forms a part of the second antenna.

2. A method as in claim 1, wherein the common range of frequencies comprises 1900 MHz.

3. A method as in claim 1, wherein the common range of frequencies comprises 850 MHz.

4. A method as in claim 1, wherein the at least one component is comprised of a stripline.

5. A method as in claim 1, wherein the at least one component is comprised of a PIN diode.

6. A method as in claim 1, wherein the at least one component is comprised of a variable capacitance.

7. A method as in claim 1, wherein the at least one component is comprised of a FET diode.

8. A method as in claim 3, wherein the at least one component is comprised of an active component that is put into a passive state.

9. A method as in claim 1, wherein the step of changing comprises operating at least one switch for adding a length of strip line to, or for subtracting a length of strip line from, the second antenna.

10. A method as in claim 1, wherein the step of changing comprises operating at least one switch for connecting a length of strip line to ground, or for disconnecting a length of strip line from ground.

11. A multi-mode mobile station wherein at least two modes operate within at least one common range of frequencies, the multi-mode mobile station comprising:
   at least first and second antennas, the first and second antennas having resonance frequencies;
   a first mode transmitter circuit coupled to the first antenna, the first mode transmitter circuit configured to operate in the at least one common range of frequencies;
   a second mode transmitter circuit coupled to the second antenna, the second mode transmitter circuit configured to operate in the at least one common range of frequencies; and
   a controller, configured to change the resonance frequency of the second antenna of the multi-mode mobile station when the first antenna is transmitting in the at least one common range of frequencies so as to reduce coupling of the transmitted signal from the first antenna into the second antenna, wherein the controller, when changing the resonance frequency of the second antenna, varies an impedance of at least one component that forms a part of the second antenna.

12. A multi-mode mobile station as in claim 11, wherein the common range of frequencies comprises 1900 MHz.

13. A multi-mode mobile station as in claim 11, wherein the common range of frequencies comprises 850 MHz.

14. A multi-mode mobile station as in claim 11, wherein the at least one component is comprised of a stripline.

15. A multi-mode mobile station as in claim 11, wherein the at least one component is comprised of a PiN diode.

16. A multi-mode mobile station as in claim 11, wherein the at least one component is comprised of a variable capacitance.

17. A multi-mode mobile station as in claim 11, wherein the at least one component is comprised of a FET diode.

18. A multi-mode mobile station as in claim 11, wherein the at least one component is comprised of an active component that is put into a passive state.

19. A multi-mode mobile station as in claim 11, wherein the controller, when changing the resonance frequency of the second antenna, operates at least one switch for adding a length of strip line to or for subtracting a length of strip line from, the second antenna.

20. A multi-mode mobile station as in claim 11, wherein the controller, when changing the resonance frequency of the second antenna, operates at least one switch for connecting a length of strip line to ground, or for disconnecting a length of strip line from ground.

21. A multi-mode mobile station as in claim 11, wherein the controller is further configured to change the resonance frequency of the first antenna of the multi-mode mobile station when the second antenna is transmitting in the at least one common range of frequencies so as to reduce coupling of the transmitted signal from the second antenna into the first antenna, wherein the controller, when changing the resonance frequency of the first antenna, varies an impedance of at least one component that forms a part of the first antenna.

* * * * *